United States Patent Office 3,682,590
Patented Aug. 8, 1972

3,682,590
METHOD OF FORMING BORIC ACID
Arsdel L. Fluesmeier, Miami, Okla., assignor to Eagle-Picher Industries, Inc., Cincinnati, Ohio
No Drawing. Filed June 6, 1969, Ser. No. 831,241
Int. Cl. C01b 35/00
U.S. Cl. 423—283                                    7 Claims

ABSTRACT OF THE DISCLOSURE

A method of forming boric acid from dimethyl ether boron trifluoride complex comprising the steps of (a) reacting together a mixture of the complex and an inorganic lithium compound having an anion selected from the group consisting of hydroxyl, carbonate and sulfate in the presence of water, the reaction resulting in reaction products that at least include lithium fluoride, dimethyl, dimethyl ether and a water solution of boric acid, and (b) separating the boric acid from the water and from all other reaction products.

---

This invention relates to a method of forming boric acid and, more particularly, relates to a method of forming boric acid from the dimethyl ether-boron trifluoride complex.

Generally speaking, the dimethyl ether-boron trifluoride complex is formed by passing boron trifluoride, which is a gas at room temperature and pressure, through dimethyl ether, which is a liquid at room temperature and pressure. The dimethyl ether-boron trifluoride complex is a rather unique starting material from which boric acid may be made. This complex, however, is quite useful in known processes for separating the boron 10 isotope from the boron 11 isotope. For example, the dimethyl ether-boron trifluoride complex may be subjected to a distillation process from which results two different dimethyl ether-boron trifluoride complex products. One of these products is enriched in the boron 10 isotope and the other is enriched in the boron 11 isotope.

Because this mode of isotopic separation is quite expensive, an isotope enriched boric acid which is obtained from the dimethyl ether-boron trifluoride complex must be obtained under process conditions which yield maximum results in terms of percent boric acid ultimately obtained from the complex. Although the process of this invention may very well find its greatest utility in the forming of boric acid from dimethyl ether-boron trifluoride complexes which are enriched either in the boron 10 isotope or in the boron 11 isotope, the process of this invention is also equally useful in the forming of boric acid from the natural dimethyl ether-boron trifluoride complex, that is, a complex which is not enriched in either isotope.

Once the boric acid has been formed, no matter what the process used for its conversion and whether that boric acid be enriched in either the boron 10 or boron 11 isotope or not enriched at all, the boric acid may thereafter be turned into pure boric oxide by known conventional methods such as by igniting the boric acid. Further, the pure boric oxide can thereafter be converted into boron metal by known conventional methods, thereby providing a boron metal enriched in either the boron 10 or the boron 11 istope if the dimethyl ether-boron trifluoride complex had been so enriched prior to its being subjected to the process of this invention.

One method known to the prior art which is particularly useful in forming boric acid from the dimethyl ether-boron trifluoride complex involves the reacting of calcium carbonate with the complex to form reaction products that include calcium fluoride and a water solution of boric acid. This method is set forth in U.S. 2,789,884 and functions quite well when operated with research scale quantities of reactants. However, it has been my experience that when calcium carbonate is reacted with the dimethyl ether-boron trifluoride complex in pilot plant or production scale quantities, as opposed to research scale quantities the calcium fluoride precipitate so formed is quite gelatinous in form, thereby making the precipitate rather difficult to filter from the water solution of boric acid also formed. Further, the gelatinous precipitate is not only difficult to filter from the boric acid solution but it is very difficult to wash the precipitate that has been so filtered to remove the residual boric acid solution from it. The steps of filtering and washing the calcium fluoride precipitate are most important to provide maximum percent yield of boric acid from the dimethylether-boron trifluoride complex.

The problem of a gelatinous precipitate becomes particularly acute on a scale of a magnitude similar to that scale illustrated in the examples below, i.e., a pilot plant scale, as well as at a production scale level of use. At such higher levels of use, it has been my experience that the percent yield of the boric acid from the process utilizing calcium carbonate is substantially below those figures claimed in U.S. 2,789,884, (the examples in the patent utilizing reactants in quantities appropriate to research scale quantities), unless great care and time is exercised in washing the precipitate or unless the precipitate is processed further to make it more crytalline prior to filteration. Such extra steps are, of course, difficult and expensive.

Basically, the method of forming boric acid from dimethylether-boron trifluoride complex, in accordance with the principles of this invention is an improvement on the method disclosed in U.S. 2,789,884 and comprises the steps of (a) reacting together a mixture of the complex and an inorganic lithium compound having an anion selected from the group consisting of hydroxyl, carbonate, and sulfate in the presence of water, the reaction resulting in reaction products that at least include lithium fluoride, dimethyl ether, and a water solution of boric acid, and (b) separating the boric acid from the water and from all other reaction products. The chemical reaction inherent in this method provides a precipitate (in the form of lithium fluoride) that is quite granular and easily filterable, thereby providing a highly efficient process and a high yield of boric acid. As a matter of fact, the precipitate granules are generally on the order of sand in size, thereby making them very easy to filter from the boric acid solution in the first instance, and permitting any residual mother liquor remaining in the precipitate to be easily washed therefrom. Further, this method of boric acid preparation provides a high percent yield of boric acid at all levels of use, i.e., at research, pilot plant and production scale levels, and promotes easier purification of the boric acid solution. Also the process permits optimum recovery of boric acid at high yields both relatively simply and relatively economically.

Accordingly it has been one objective of this invention to provide a method of preparing boric acid from the dimethylether-boron trifluoride complex which results in a very high degree of conversion, for example, 95 to 100% at all scales of use.

Further, it has been another objective of this invention to provide a method of forming boric acid from the dimethyl ether-boron trifluoride complex which utilizes an inorganic lithium compound having an anion selected from the group consisting of hydroxyl, carbonate and sulfate, a compound from this group having been found to impart a degree of economy and simplicity in processing the complex to boric acid not heretofore obtainable by prior art methods.

Other objectives and advantages will be more apparent from the following detailed description of the invention and from the examples set forth in the specification below.

In the preferred practice of my process, I first provide a mixture of the dimethyl ether-boron trifluoride complex and an inorganic lithium compound having an anion selected from the group consisting of hydroxyl, carbonate and sulfate in the presence of water to permit the desired reaction of those components to take place. The mixture is preferably formed by first establishing the inorganic lithium compound in slurry or solution form with water. Preferably, the slurry or solution has a water component on the order of six or seven times as great in volume as the volume of the dimethyl ether-boron trifluoride complex to be added. Subsequently, the dimethyl ether-boron trifluoride complex, whether that complex is in its natural state or in an isotope enriched state, is added slowly to the slurry or solution at room temperature over a prolonged period of time. Such a period of time will, of course, vary with the quantities of reactants involved, but in no event should the time be so short that any reactant or reaction product will be carried out of the slurry or solution that is desired left in the slurry or solution, for example, the complex and/or the boric acid, due to bubbling of the mixture brought about by the heat of reaction of the components (which creates an exothermic reaction state) or due to the evolution of dimethyl ether gases which may result from the reaction and the presence of localized areas of heat in the mixture during the reaction.

As the dimethyl ether-boron trifluoride complex is put into the slurry or solution, the boron trifluoride reacts with the water to form fluoborates or intermediate hydroxyfluoborates which are very slowly hydrolyzed to boric acid even at elevated temperatures, as well as hydrogen fluoride. The reaction to form the boric acid will not proceed to completion unless the hydrogen fluoride is removed; this removal is accomplished in my process by reacting the hydrogen fluoride with an inorganic lithium compound having an anion selected from the group consisting of hydroxyl, carbonate, and sulfate to form an insoluble lithium fluoride precipitate.

The relatively slow hydrolysis reactions are preferably speeded up so that the total reaction can be driven to completion in a reasonable period of time by refluxing the mixture at an elevated temperature for a sufficient period of time to hydrolyze all of the boron intermediates formed in the reaction into boric acid. The elevated temperature at which refluxing is carried out is that temperature sufficient to vaporize all the dimethyl ether reaction produced so that it can escape through the refluxing apparatus and insure complete reaction between the boron trifluoride and the lithium component. It has been my experience that this may very well take a period of time on the order of ten or twelve hours or more. A sufficient temperature is generally on the order of about 100° C.

During the refluxing of the mixture, no matter which inorganic lithium compound is used, the reaction converts the initial reactants in the mixture to reaction products that at least include lithium fluoride, a water solution of boric acid, and dimethyl ether. Other reaction products may also be formed depending on the lithium compound used. The equations below are illustrative of the three different types of lithium compounds found useful in accordance with the practice of this invention, namely, lithium carbonate, lithium hydroxide, and lithium sulfate. The reactions occur according to the following equations:

(1) 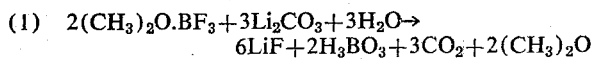
$2(CH_3)_2O.BF_3 + 3Li_2CO_3 + 3H_2O \rightarrow$
$6LiF + 2H_3BO_3 + 3CO_2 + 2(CH_3)_2O$ (2) 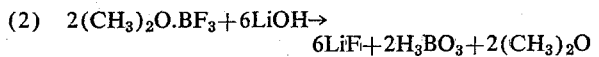
$2(CH_3)_2O.BF_3 + 6LiOH \rightarrow$
$6LiF + 2H_3BO_3 + 2(CH_3)_2O$ (3) 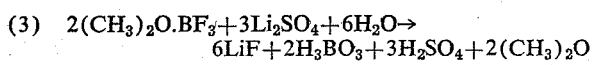
$2(CH_3)_2O.BF_3 + 3Li_2SO_4 + 6H_2O \rightarrow$
$6LiF + 2H_3BO_3 + 3H_2SO_4 + 2(CH_3)_2O$ Generally speaking, a slight excess of the lithium component is desirable.

After refluxing the reactions will have been driven to completion as indicated by the above Equations 1–3 but only in the Equations 1 and 2 will the lithium fluoride precipitate out without further steps being required. Upon completion of the refluxing step, the pH of the mixture must be of a value between about 6.0 and about 7.0 for precipitation of the lithium fluoride to occur. In the use of the lithium carbonate and lithium hydroxide compounds illustrated in Equations 1 and 2 once the refluxing of the mixture has been completed the pH value will fall within this range. With lithium carbonate even though a weakly acidic substance, namely, carbon dioxide, is formed during the reaction the carbon dioxide escapes during the reaction because it is a gas and, thus, imparts no acidic characteristics to the reaction products. With lithium hydroxide no reaction product with acid characteristics is formed in the reaction in the first instance.

However, when lithium sulfate is used the pH of the mixture is only about 1.0 after the reaction is completed, that is, after refluxing, and the pH must be brought within the desired range of about 6.0 to about 7.0 by a further step before the lithium fluoride will precipitate out. This step includes additional refluxing of the reaction products formed with a basic composition to neutralize the sulfuric acid generated in the original reaction. For example, barium hydroxide may be used and the reaction proceeds as follows:

(4) 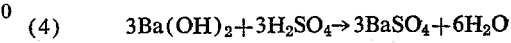 $3Ba(OH)_2 + 3H_2SO_4 \rightarrow 3BaSO_4 + 6H_2O$

Thus, where lithium sulfate is used in the original reaction mixture, sufficient barium hydroxide, for example, must be added after the reaction proceeds to neutralize the sulphuric acid and provide a final pH of between about 6.0 and about 7.0 so that the lithium fluoride completely precipitates out of the mixture. Of course, the barium sulfate will also be a part of the total precipitate, thereby leaving a water solution of boric acid, as is the case in chemical Equations 1 and 2, after the second refluxing with the barium hydroxide.

The lithium fluoride formed in all cases by this method is a very granular precipitate having a particle size on the order of sand, and is easily filterable from the refluxed mixture. In the case of lithium sulfate, the barium sulfate is also easily filtered out with the lithium fluoride.

Once the lithium fluoride precipitate has been formed, as well as the barium sulfate in the case of lithium sulfate, the precipitates are filtered out of the mother liquor. The precipitate is then washed with water and refiltered a number of times to ensure that all the mother liquor which carries the boric acid in solution has been separated from the precipitate. The wash water is then added back to the original mother liquor to form a mother liquor solution. Because of the nature of the chemical reactions indicated at 1–4 and the nature of the filtrate or precipitate, the lithium fluoride precipitate now separated generally represents substantially all of the lithium fluoride formed in the reaction. That is, the lithium fluoride is formed in such a granular sand-like form that it is very easily filtered from the mother liquor and the water solution of boric acid separated from it.

Any small amount of lithium remaining in the mother liquor solution is removed by passing the mother liquor solution through an ion exchange column to remove the residual lithium ions, thereby providing the mother liquor or boric acid solution with an absolute minimum p.p.m. of lithium ions and the desired purity. The ion exchange column may be of any type commonly used in the art. The ion exchange resin used preferably is in the hydrogen form whereby a hydrogen ion is exchanged for a lithium ion as the boric acid solution passes through the column. The ion resin preferred is of the cation exchange type having $SO_3^-$ as the functional group with the matrix being styrene divinyl benzene copolymer. A suitable ion exchange resin is that known as Amberlite IR-120, Rohm & Haas Company, Philadelphia, Pa.

Once the boric acid solution has been adequately cleansed of lithium through the ion exchange step, the boric acid is recovered in crystal form from the water solution thereof by evaporating the water from the acid with the application of heat. Preferably the solution is heated to just below its boiling temperature and the water evaporated until boric acid crystals start to form in the solution, that is, until a slurry appears. That slurry is then substantially cooled, for example, to about 0° C. whereby a major portion of the boric acid crystals are precipitated out. The boric acid crystal precipitate is separated by filtration from the mother liquor and those crystals washed of the mother liquor. The wash water is then mixed back with the mother liquor and the evaporating procedure repeated. This step is repeated a number of times until all boric acid is removed from the mother liquor, that is, until no further boric acid crystals form upon evaporation of the water. Such a procedure permits final recovery of boric acid generally on the order of at least about 98% with no impurities of significant quantities being present in the boric acid.

If boron oxide is desired, the boric acid may be ignited by conventionally known methods to produce the boron oxide. Further, if boron metal is desired, the boron oxide may be reduced by conventionally known methods to boron metal. In the case of boron metal where it is desired to produce such metal with enriched quantities of either boron 10 isotope or boron 11 isotope, the method of this invention provides a very efficient intermediary process for converting the dimethyl ether-boron trifluoride complex that has been enriched in either the boron 10 isotope or the boron 11 isotope to the boron metal.

This invention is further illustrated by the following examples:

EXAMPLE I

Powdered lithium carbonate ($Li_2CO_3$) in the amount of 1950 gms. is mixed with 10,000 ml. of water to form a solution. Thereafter, 1500 ml. (1845 gms.) of natural dimethyl ether-boron trifluoride complex (that is, a complex enriched in neither boron 10 nor boron 11 isotope) is slowly added to the solution to form a mixture. The addition of all the complex to the solution is accomplished over a time period of 2 hrs., 30 min. while maintaining the solution approximately at room temperature and while intimately and continuously stirring the mixture.

Once the complex has been integrally admixed with the solution of water and lithium carbonate, the mixture is refluxed with any known type of condenser column apparatus for 12 hours at approximately 100° C. This drives the reaction of Equation 1, see above, to completion and drives off as gases the residual dimethyl ether and carbon dioxide in the mixture.

After completion of the refluxing of the mixture, the pH of the solution is about 7.0 and the lithium fluoride generated from the reaction is in a granular, easily filterable form. The lithium fluoride precipitate is filtered from the mother liquor at approximately 60° C. The precipitate is washed by decantation with 5,000 ml. of water at approximately 60° C. The lithium fluoride precipitate granules are of a size on the order of sand, and the precipitate filters readily with very little absorption of mother liquor.

The mother liquor and washings are added together and are further diluted with water to a final volume of 20,130 ml. This total liquid amount is then passed through an ion exchange column at the maximum efficiency rate. The ion exchange resin used is Amberlite IR-120, Rohm and Haas Company, Philadelphia, Pa. After passage of the mother liquor solution through the ion exchange column, the exchange resin was washed with two 5,000 ml. portions of water to recover any mother liquor solution trapped in the resin. The solution and wash waters are then combined to give a final liquid volume of 30,950 ml.

Subsequently the water or mother liquor solution of boric acid is evaporated with heat by heating to just below boiling point of the solution. Water is evaporated from the solution until a slurry of boric acid crystals begins to form; thereafter the slurry is refrigerated to approximately 0° C. to precipitate out the boric acid crystals. The boric acid crystals are filtered and washed, the wash water being replaced back with the mother liquor solution. This evaporating and precipitating step is repeated until all boric acid is removed from the mother liquor solution.

By this method the final recovery of boric acid is approximately 98% and the boric acid contains no significant impurities. Of the total amount boric acid recovered, 180 gms. are ignited by conventional methods to boron oxide ($B_2O_3$); the quality of the boron oxide is commercially acceptable.

EXAMPLE II

Hydrated lithium hydroxide crystals ($LiOH \cdot H_2O$) in the amount of 258 gms. is mixed with 1,200 ml. of water to form a solution. Thereafter, 175 ml. of natural dimethyl ether-boron trifluoride complex (that is, a complex enriched in neither boron 10 nor boron 11 isotope) is slowly added to the solution to form a mixture. The addition of all the complex to the solution is accomplished over a time period of about 30 minutes while maintaining the solution approximately at room temperature and while intimately and continuously stirring the mixture.

Once the complex has been integrally admixed with the solution of water and lithium hydroxide, the mixture is refluxed with any known type of condenser column apparatus for 15 hours at approximately 100° C. This drives the reaction of Equation 2, see above, to completion and drives off as a gas the residual dimethyl ether in the mixture.

After completion of the refluxing of the mixture, the pH of the solution is about 7.0 and the lithium fluoride generated from the reaction is in a granular, easily filterable form. The lithium fluoride precipitate is filtered from the mother liquor at approximately 60° C. The precipitate is washed by decantation with about 500 ml. of water at approximately 60° C. The lithium fluoride precipitate granules are of a size on the order of sand, and the precipitate filters readily with very little absorption of mother liquor.

The mother liquor and washings are added together, and a portion of this total liquid amount is then passed through an ion exchange column at the maximum efficiency rate. The ion exchange resin used is Amberlite IR-120, Rohm and Haas Company, Philadelphia, Pa. After passage of the mother liquor solution through the ion exchange column, the exchange resin was washed with two portions of water to recover any mother liquor solution trapped in the resin. The solution and wash waters are then combined.

Subsequently the water or mother liquor solution of boric acid is evaporated with heat by heating to just below boiling point of the solution. Water is evaporated from the solution until a slurry of boric acid crystals begins to form; thereafter the slurry is refrigerated to approximately 0° C. to precipitate out the boric acid crystals. The boric acid crystals are filtered and washed, the wash water being replaced back with the mother liquor solution. This evaporating and precipitating step is repeated until all boric acid is removed from the mother liquor solution.

By this method the final recovery of boric acid is approximately 98% and the boric acid contains no significant impurities.

EXAMPLE III

Hydrated lithium sulfate crystals ($Li_2SO_4 \cdot H_2O$) in the amount of 210 gms. is mixed with 1,000 ml. of water to form a solution. Thereafter, 100 ml. of natural dimethylether-boron trifluoride complex (that is, a complex enriched in neither boron 10 nor boron 11 isotope) is slowly added to the solution to form a mixture. The addition of all the complex to the solution is accomplished over a time period of about 30 minutes while maintaining the solution approximately at room temperature and while intimately and continuously stirring the mixture.

Once the complex has been integrally admixed with the solution of water and lithium sulfate, the mixture is refluxed with any known type of condenser column apparatus for 12 hours at approximately 100° C. This drives the reaction of Equation 3, see above, to completion and drives off as a gas the residual dimethylether in the mixture.

After completion of the refluxing of the mixture, the pH of the solution is only about 1.0 and the lithium fluoride generated from the reaction remains in solution. In order to remove the $SO_4$— ion from the solution and to raise the pH to between 6.0 and 7.0, 511 gms. of $Ba(OH)_2 \cdot 8H_2O$ was added slowly to the solution with constant stirring. There is very little reaction until the solution is heated, and the solution is refluxed at 100° C. for 10 hours. During the reflux the barium sulfate ($BaSO_4$) and lithium fluoride start to precipitate and precipitation is complete after the refluxing is finished. The final pH after refluxing is between 6.0 and 7.0. The two mixed precipitates are both granular and easily filterable in form, and are both filtered from the mother liquor at approximately 60° C. The precipitate is washed by decantation with water at approximately 60° C. Analysis shows the precipitate contains essentially all of the barium sulfate and lithium fluoride to be expected. The mixed lithium fluoride and barium sulfate precipitate granules are of a size on the order of sand, and the precipitate filters readily with very little absorption of mother liquor.

The mother liquor and washings are added together, and a portion of this total liquid amount is then passed through an ion exchange column at the maximum efficiency rate. The ion exchange resin used is Amberlite IR-120, Rohm and Haas Company, Philadelphia, Pa. After passage of the mother liquor solution through the ion exchange column, the exchange resin was washed with two portions of water to recover any mother liquor solution trapped in the resin. The solution and wash waters are then combined.

Subsequently the water or mother liquor solution of boric acid is evaporated with heat by heating to just below boiling point of the solution. Water is evaporated from the solution until a slurry of boric acid crystals begins to form; thereafter the slurry is refrigerated to approximately 0° C. to precipitate out the boric acid crystals. The boric acid crystals are filtered and washed, the wash water being replaced back with the mother liquor solution. This evaporating and precipitating step is repeated until all boric acid is removed from the mother liquor solution.

By this method the final recovery of boric acid is approximately 99% and the boric acid contains no significant impurities.

EXAMPLE IV

Powdered lithium carbonate ($Li_2CO_3$) in the amount of 1165 gms. is mixed with 10,000 m. of demineralized water to form a solution. Thereafter 920 ml. (1132) gms.) of boron-10 enriched dimethylether boron tri-fluoride complex is slowly added to the solution to form a mixture. The boron-10 enriched complex analyzes to 8.82% total boron of which 92.37% is boron-10. The addition of all the complex to the solution is accomplished over a time period of 2 hrs., 30 mins. while maintaining the solution approximately at room temperature and while intimately and continuously stirring the mixture.

When the boron-10 enriched complex has been integrally admixed with the solution of water and lithium carbonate, the mixture is refluxed with any known type of condenser column apparatus for 12 hours at approximately 100° C. This drives the reaction of Equation 1, see above, to completion and drives off as gases the residual dimethylether and carbon dioxide in the mixture.

After completion of the refluxing of the mixture, the pH of the solution is about 7.0 and the lithium fluoride generated from the reaction is in a granular, easily filterable form. The lithium fluoride precipitate is filtered from the mother liquor at approximately 60° C. The precipitate is washed by decantation with 2,000 ml. of water at approximately 60° C. The lithium fluoride precipitated granules are of a size on the order of sand, and the precipitate filters readily with very little absorption of mother liquor.

The mother liquor and washings are added together and are passed through an ion exchange column at the maximum efficiency rate. The ion exchange resin used is Amberlite IR-120, Rohm and Haas Company, Philadelphia, Pa. This step removes residual lithium ions from the solution. After passage of the mother liquor solution through the ion exchange column the exchange resin is washed with about 4,000 ml. of demineralized water to recover any boric acid trapped in it. The solution and wash waters are then combined.

Subsequently the water or mother liquor solution of boric acid is evaporated with heat by heating to just below boiling of the solution. Water is evaporated from the solution until a slurry of boric acid crystals begins to form. Thereafter the slurry is refrigerated to approximately 0° C. to precipitate out the boric acid crystals. The boric acid crystals are filtered and washed, the wash water being replaced back with the mother liquor solution. This evaporating and precipitating step is repeated until substantially all boric acid is removed from the mother liquor solution.

By this method the final recovery of boron-10 enriched boric acid is approximately 98% and the boron-10 enriched boric acid contains no significant impurities.

Having described the preferred embodiment of my invention in full detail, what I desire to claim and protect by Letters Patent is:

1. A method of forming boric acid from dimethyl ether-boron trifluoride complex comprising the steps of:
    reacting together a mixture of the dimethyl ether-boron trifluoride complex and an organic lithium compound having an anion selected from the group consisting of hydroxyl, carbonate, and sulfate in the presence of water, said reaction resulting in reaction products that at least include lithium fluoride, dimethyl ether, and water solution of boric acid,
    regulating the pH of the boric acid water solution to a value between about 6.0 and about 7.0, thereby causing the lithium fluoride to precipitate out of the boric acid water solution, and
    filtering the boric acid solution free of the lithium fluoride after precipitation of the lithium fluoride.

2. A method as set forth in claim 1 wherein the step of reacting comprises the step of:
    refluxing the mixture for a period of time sufficient to convert substantially all of the boron component in the complex to boric acid.

3. A method as set forth in claim 2 wherein the reacting step further comprises the steps of:
    first forming a solution of the inorganic lithium compound in water, and
    thereafter adding the complex to the solution.

4. A method as set forth in claim 1 including the further step of:
    passing the precipitate free boric acid solution through an ion exchange column to remove residual lithium ion not removed during filtration.

5. A method as set forth in claim 1 wherein said inorganic lithium compound is lithium carbonate.

6. A method as set forth in claim 1 wherein said inorganic lithium compound is lithium hydroxide.

7. A method as set forth in claim 1 including the further steps of:
  evaporating water from the boric acid solution until boric acid crystals start to appear in that solution,
  thereafter cooling the evaporated boric acid solution at least to about 0° C., and
  finally filtering the boric acid crystals from the evaporated and cooled boric acid solution.

References Cited

UNITED STATES PATENTS 2,789,884   4/1957   Rodden et al. _____ 23—149

OTHER REFERENCES

"Soviet Inventions Illustrated, Sec. 1, Chemical," Derwent Publications Ltd., London, February 1966, Group Six, pp. 1-2 (Disclosure of U.S.S.R. Patent 169,089).

HERBERT T. CARTER, Primary Examiner

U.S. Cl. X.R.

260—614; 423—490